(12) United States Patent
Lv (10) Patent No.: US 10,518,399 B2
(45) Date of Patent: Dec. 31, 2019

(54) CLUTCH DEVICE AND POWER TOOL WITH CLUTCH DEVICE

(71) Applicant: CHERVON (HK) LIMITED, Wanchai (HK)

(72) Inventor: Yue Lv, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 422 days.

(21) Appl. No.: 15/275,547

(22) Filed: Sep. 26, 2016

(65) Prior Publication Data

US 2017/0087705 A1 Mar. 30, 2017

(30) Foreign Application Priority Data

Sep. 30, 2015 (CN) .......................... 2015 1 0643064
Mar. 29, 2016 (CN) ...................... 2016 2 0248934 U (51) Int. Cl.
| | |
|---|---|
| *B25D 16/00* | (2006.01) |
| *F16H 1/20* | (2006.01) |
| *F16H 21/44* | (2006.01) |
| *B25D 11/06* | (2006.01) |
| *B25F 5/00* | (2006.01) |

(52) U.S. Cl.
CPC .......... *B25D 16/003* (2013.01); *B25D 11/062* (2013.01); *B25D 16/006* (2013.01); *B25F 5/001* (2013.01); *F16H 1/20* (2013.01); *F16H 21/44* (2013.01); *B25D 2211/006* (2013.01); *B25D 2250/045* (2013.01); *B25D 2250/085* (2013.01); *B25D 2250/371* (2013.01)

(58) Field of Classification Search
CPC ................ B25D 16/006; B25D 16/003; B25D 2250/045; B25D 2250/371; B25D 2250/085; B25D 2211/006; B25D 11/062; F16H 21/44; F16H 1/20; B25F 5/001
See application file for complete search history.

(56) References Cited

U.S. PATENT DOCUMENTS

| | | | | |
|---|---|---|---|---|
| 8,104,544 B2 * | 1/2012 | Ullrich | ................ | B25D 16/003 173/104 |
| 8,176,994 B2 * | 5/2012 | Ullrich | ................ | B25D 16/003 173/104 |
| 8,230,943 B2 * | 7/2012 | Felger | ................ | B25D 16/006 173/48 |
| 8,281,872 B2 * | 10/2012 | Duesselberg | ........ | B25D 16/006 173/109 |

(Continued)

*Primary Examiner* — Chelsea E Stinson
*Assistant Examiner* — Thomas M Wittenschlaeger
(74) *Attorney, Agent, or Firm* — Greenberg Traurig, LLP (57) ABSTRACT

A clutch device includes a guiding element, a first clutch element being capable of sliding relative to the guiding element, a second clutch element being capable of sliding relative to the guiding element, an elastic element including a first connecting leg and a second connecting leg which are respectively connected with the first clutch element and the second clutch element, and a rotating element being capable of rotating about a first axis relative to the guiding element. The rotating element includes a first supporting portion for contacting with the first connecting leg, which is disposed at a first axial position of the first axis, and a second supporting portion for contacting with the second connecting leg, which is disposed at a second axial position of the first axis.

10 Claims, 10 Drawing Sheets (56) References Cited

U.S. PATENT DOCUMENTS

| | | | | |
|---|---|---|---|---|
| 9,227,312 B2 * | 1/2016 | Wang | B25D 16/006 | |
| 9,841,066 B2 * | 12/2017 | Yoshikane | B25D 16/003 | |
| 2007/0102174 A1 * | 5/2007 | Duesselberg | B25D 16/006 | |
| | | | 173/48 | |
| 2008/0169111 A1 * | 7/2008 | Duesselberg | B25D 16/006 | |
| | | | 173/48 | |
| 2009/0145618 A1 * | 6/2009 | Duesselberg | B25D 16/006 | |
| | | | 173/48 | |
| 2009/0159304 A1 * | 6/2009 | Teranishi | B25D 11/062 | |
| | | | 173/48 | |
| 2009/0308626 A1 * | 12/2009 | Saur | B25D 11/062 | |
| | | | 173/48 | |
| 2010/0025059 A1 * | 2/2010 | Felger | B25D 16/006 | |
| | | | 173/47 | |
| 2010/0051303 A1 * | 3/2010 | Ullrich | B25D 16/006 | |
| | | | 173/48 | |
| 2012/0099936 A1 * | 4/2012 | Bean | B25F 5/001 | |
| | | | 408/124 | |
| 2015/0367490 A1 * | 12/2015 | Satou | B25D 11/062 | |
| | | | 173/48 | |
| 2015/0372633 A1 * | 12/2015 | Machida | B25D 16/006 | |
| | | | 318/14 | |
| 2017/0106517 A1 * | 4/2017 | Machida | B25D 17/24 | |

* cited by examiner

CLUTCH DEVICE AND POWER TOOL WITH CLUTCH DEVICE

RELATED APPLICATION INFORMATION

This application claims the benefit under 35 U.S.C. § 119(a) of Chinese Patent Application No. CN 201510643064.8, filed on Sep. 30, 2015, and Chinese Patent Application No. CN 201620248934.1, filed on Mar. 29, 2016, each of which is incorporated herein by reference in its entirety.

FIELD OF THE DISCLOSURE

The present disclosure relates generally to power tools and, more particularly, to an electric hammer with a clutch device.

BACKGROUND OF THE DISCLOSURE

Currently known rotary tools can output impact force while outputting torque. For example, an electric hammer can output one of a reciprocating impact force and an output torque or output both of them at the same time. In order to allow a user to switch work models according to requirements, these power tools commonly include a complex transmission mechanism and a corresponding clutch.

Currently known clutches have an adjusting direction which is the same as an engaging and disengaging direction. So the tools may have a large size, and the clutches have a long stroke which does not facilitate the user switching the work models quickly.

The transmission mechanism commonly includes two gears which can engage or disengage with each other under the action of the clutch. However, currently known gears often fail to engage during the engagement process.

The statements in this section merely provide background information related to the present disclosure and may not constitute prior art.

SUMMARY

In one aspect of the disclosure, a clutch device includes a guiding element, a first clutch element being capable of sliding relative to the guiding element, a second clutch element being capable of sliding relative to the guiding element, an elastic element including a first connecting leg and a second connecting leg which are respectively connected with the first clutch element and the second clutch element and a rotating element being capable of rotating about a first axis relative to the guiding element. The rotating element includes a first supporting portion for contacting with the first connecting leg, which is disposed at a first axial position of the first axis and a second supporting portion for contacting with the second connecting leg, which is disposed at a second axial position of the first axis. When the rotating element is rotated about the first axis, the first connecting leg is driven by the first supporting portion so that the first clutch element slides relative to the guiding element, and the second connecting leg is driven by the second supporting portion so that the second clutch element slides relative to the guiding element.

In another aspect of the disclosure, an electric hammer includes a rotating assembly for outputting rotating force, a motor having a motor shaft, a transmission assembly for transferring power output by the motor to the rotating assembly and a clutch device. The transmission assembly includes a transmission element rotating synchronously with the transmission assembly and a first driving element being capable of rotating when driven by the motor. The clutch device is capable of driving the first driving element to move forward in a direction of a rotating axis of the first driving element to contact with the transmission element so as to drive the transmission element to rotate or move backward to disengage with the transmission element. The first driving element is formed with first external teeth extending in a direction substantially parallel to the rotating axis of the first driving element and second external teeth extending in the direction substantially parallel to the rotating axis of the first driving element. In the direction substantially parallel to the rotating axis of the first driving element, the first external teeth have a first front end, the second external teeth have a second front end, and the first front end is protruded relative to the second front end.

In yet another aspect of the disclosure, a power tool includes a housing, an output element for outputting power, a prime mover contained within the housing, a transmission assembly for transferring the power output by the prime mover to the output element and a clutch device. The transmission assembly includes a transmission element being capable of driving the output element to rotate and a first driving element being capable of rotating when driven by the prime mover. The clutch device is capable of driving the first driving element to move forward in a direction of a rotating axis of the first driving element to contact with the transmission element so as to drive the transmission element to rotate or move backward to disengage with the transmission element. The first driving element is formed with first external teeth extending in a direction substantially parallel to the rotating axis of the first driving element and second external teeth extending in the direction substantially parallel to the rotating axis of the first driving element. In the direction substantially parallel to the rotating axis of the first driving element, the first external teeth have a first front end, the second external teeth have a second front end, and the first front end is protruded relative to the second front end.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Figure 1:
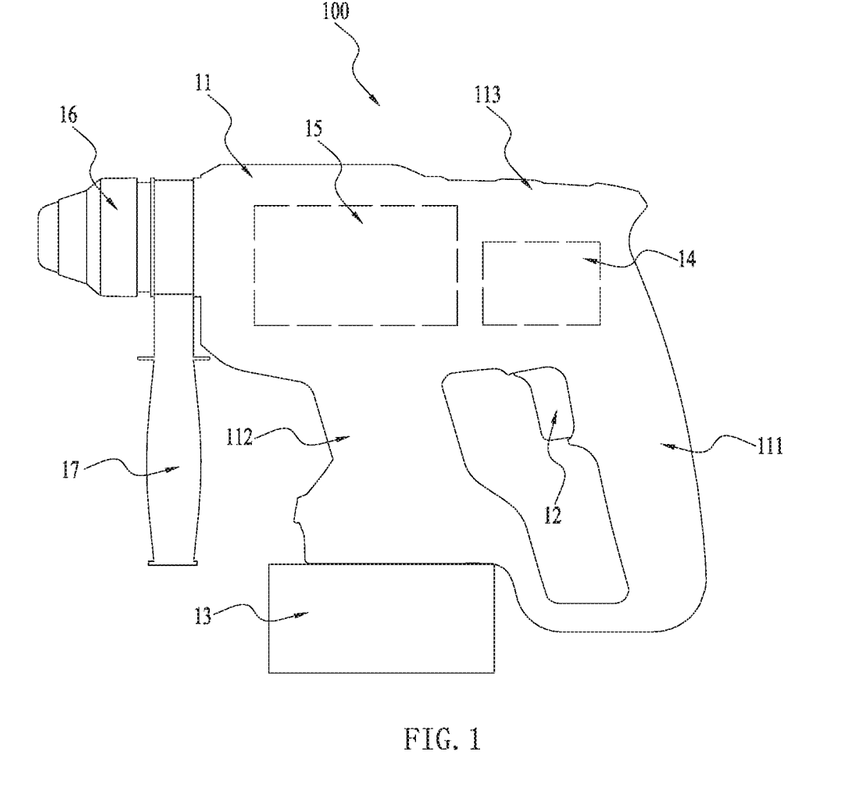
FIG. 1 is a schematic view of an exemplary electric hammer.

The invention hereinafter claimed refers to a power tool. As shown in FIG. 1, the power tool may be an electric hammer 100. The electric hammer 100 includes a housing 11, a trigger 12, a battery pack 13, a motor 14, a transmission mechanism 15, a chuck 16 and an auxiliary handle 17.

The housing 11 forms a shell of the electric hammer 100, which is configured to contain the internal components of the electric hammer 100. The housing 11 includes a handle portion 111, a first containing portion 112 and a second containing portion 113. The handle portion 111 and the first containing portion 112 are disposed on the same side of the second containing portion 113, and the handle portion 111 has an extending direction which is substantially parallel to an extending direction of the first containing portion 112. The handle portion 111 is provided for a user to grip, which is connected with on an end of the second containing portion 113. The first containing portion 112 is configured to contain a circuit board, which is connected with the second containing portion 113 in the middle portion of the second containing portion 113. The first containing portion 112 is far from the end of the second containing portion 113, which is also used to connect the battery pack 13. The second containing portion 113 is configured to contain the motor 14, the transmission mechanism 15, etc.

The trigger 12 is mounted on the handle portion 111 close to the second containing portion 113. Thus, the user can activate the trigger 12 conveniently while gripping the handle portion 111. The trigger 12 is a main switch for starting the motor 14.

The battery pack 13 is detachably connected with the first containing portion 112, which is used to supply electric energy for the electric hammer 100.

The motor 14 acts as a prime mover of the electric hammer 100, which is disposed in the second containing portion 113 of the housing 11. The motor 14 is used to convert electric energy supplied by the batter pack 13 into mechanical energy and to transfer the mechanical energy to the transmission mechanism 15. For power tools, the motor 14 can be another prime mover, for example, an engine. The transmission mechanism 15 is disposed between the motor 14 and the chuck 16, which is used to transfer the mechanical energy from the motor 14 to an attachment such as a drill bit or a chisel bit.

The chuck 16 acts as an output element of the electric hammer 100, which is used to output mechanical energy. The chuck 16 also can detachably connect the drill bit or the chisel bit to the electric hammer 100.

The auxiliary handle 17 is provided for the user to grip with one hand while the other hand grips the handle portion 111. Thus, the electric hammer 100 can be gripped by the two hands of the user in its front and rear position, and a center of gravity of the electric hammer 100 is located between the two hands, which improves the stability of the user's grip.

Figure 2:
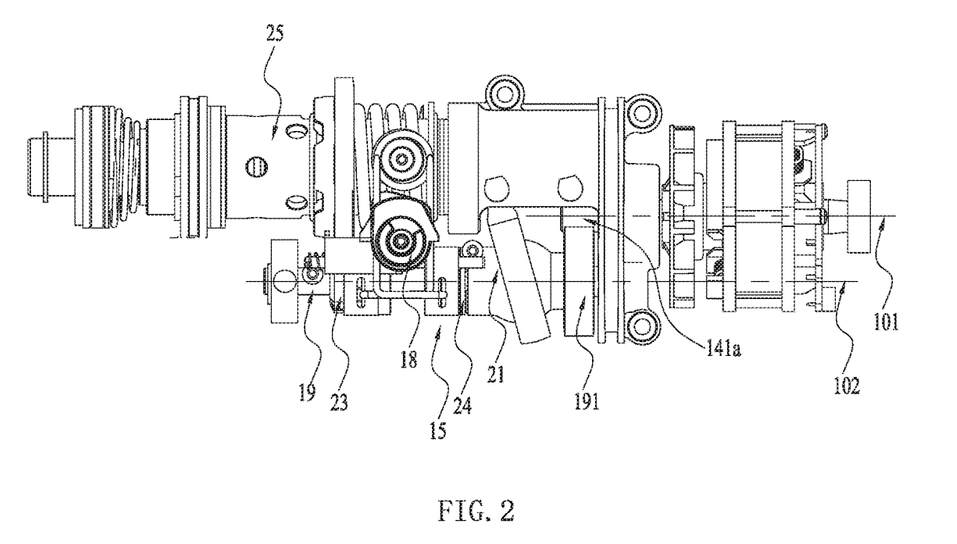
FIG. 2 a schematic view of an inner structure of the exemplary electric hammer in FIG. 1.
Figure 3:
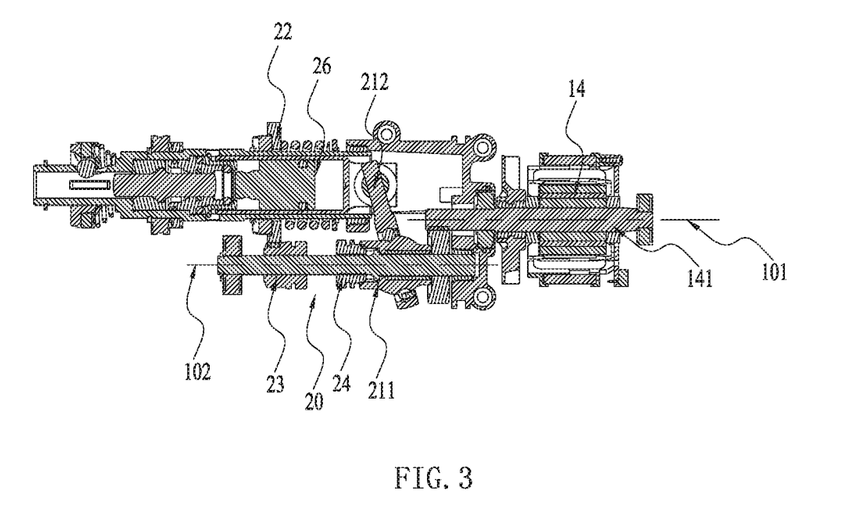
FIG. 3 is a sectional view of a part of the structure in FIG. 2.

Referring to FIGS. 2-3, the electric hammer 100 further includes a clutch device 18. The motor 14 includes a motor shaft 141. The transmission mechanism 15 includes a transmission assembly 20, a rotating assembly 25 and an impacting assembly 26. The transmission assembly 20 is used to transfer mechanical energy output by the motor 14 to the chuck 16. Specifically, the transmission assembly 20 can transfer mechanical energy to the rotating assembly 25 or the impacting assembly 26 connected with the chuck 16. The transmission assembly 20 includes a central shaft 19, a pendulum bearing 21, a transmission element 22, a first driving element 23 and a second driving element 24. The clutch device 18 is used to switch the transmission modes of the transmission mechanism 15. The rotating assembly 25 is used to make the electric hammer 100 output a rotating force. The impacting assembly 26 is used to make the electric hammer 100 output an impacting force.

The motor shaft 141 is capable of rotating about a motor axis 101. The motor shaft 141 is formed with or fixedly connected with an output gear 141a. The output gear 141a is used to transfer mechanical energy of the motor 14 to the central shaft 19.

The central shaft 19 is extended in a direction of a central axis 102 which is substantially parallel to the motor axis 101. The central shaft 19 is formed with or fixedly connected with an input gear 191 on its end that is closest to the motor shaft 141. The input gear 191 is capable of engaging with the output gear 141a of the motor shaft 141. Thus, when the motor 14 is activated, the motor shaft 141 is rotated about the motor axis 101, and the output gear 141a is engaged with the input gear 191 so as to drive the central shaft 19 to rotate about the central axis 102.

The pendulum bearing 21 includes a plate 211 and an oscillating rod 212. The plate 211 is mounted on the central shaft 19 and is capable of rotating relative to the central shaft 19. The oscillating rod 212 is connected with the impact assembly 26. When the plate 211 is rotated, the oscillating rod 212 drives the impact assembly 26 to do a reciprocating movement, so that the mechanical energy is transferred to the attachment such as the drill bit or the chisel bit, and the drill bit or the chisel bit can impact the workpiece. Thus, a function of a chisel for the electric hammer 100 is realized.

The transmission element 22 is rotated synchronously with the rotating assembly 25. That means, when one of the transmission element 22 and the rotating assembly 25 is rotated, the other one is rotated together, and when one of the transmission element 22 and the rotating assembly 25 is limited to rotate, the other one is limited to rotate. The meaning of 'rotate synchronously' also applies to other components which are rotated synchronously. So when the transmission element 22 is rotated, the rotating assembly 25 drives the chuck 16 to output mechanical energy.

The first driving element 23 and the second driving element 24 can be driven by the motor 14 to rotate. Specifically, the first driving element 23 and the second driving element 24 are mounted on the central shaft 19 and capable of rotating synchronously with the central shaft 19. When the first driving element 23 contacts with the transmission element 22, the transmission element 22 is driven to rotate. When the second driving element 24 contacts with the pendulum bearing 21, the plate 211 is driven to rotate.

Thus, when the central shaft 19 is rotated about the central axis 102, if the first driving element 23 contacts with the transmission element 22 and the second driving element 24 is disengaged with the pendulum bearing 21, the impact assembly 26 drives the attachment to do reciprocating movement. If the first driving element 23 contacts with the transmission element 22 and the second driving element 24 contacts with the pendulum bearing 21, the rotating assembly 25 drives the attachment to rotate and the impact assembly 26 drives the attachment to do reciprocating movement.

The following is a specific introduction about the structure of the clutch device 18 and how the clutch device 18 changes the position of the first driving element 23 and the second driving element 24.

Figure 4:
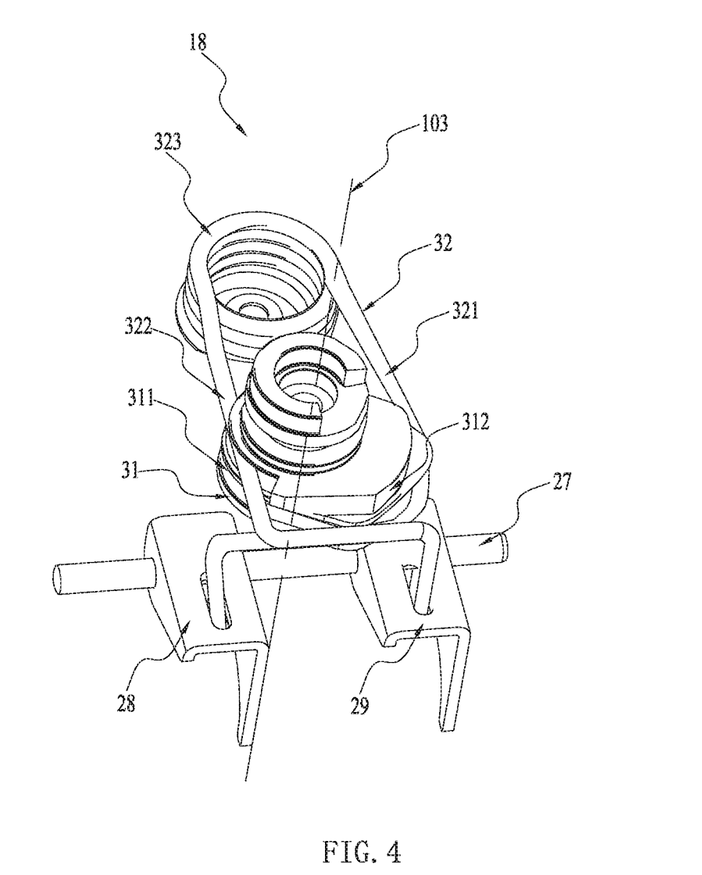
FIG. 4 is a schematic view of a clutch device in FIG. 2.

As shown in FIG. 4, the clutch device 18 includes a guiding element 27, a first clutch element 28, a second clutch element 29, a rotating element 31 and an elastic element 32. The guiding element 27 is a guiding rod which is extended along a direction parallel to the motor axis 101. The guiding element 27 is fixed relative to the housing 11. The first clutch element 28 is capable of sliding relative to the guiding element 27, and the second clutch element 29 is also capable of sliding relative to the guiding element 27. The rotating element 31 is capable of rotating about a first axis 103 which is perpendicular to the motor axis 101. The rotating element 31 is formed with a first supporting portion 311 and a second supporting portion 312. The elastic element 32 includes a first connecting leg 321, a second connecting leg 322 and an elastic connecting portion 323. The first connecting leg 321 is connected with the second connecting leg 322 through the elastic connecting portion 323. The first connecting leg 321 contacts with the first supporting portion 311, and the second connecting leg 322 contacts with the second supporting portion 312. Further, the first connecting leg 321 and the second connecting leg 322 respectively contact with the first supporting portion 311 and the second supporting portion 312 from the two sides of the first axis 103.

Figure 5:
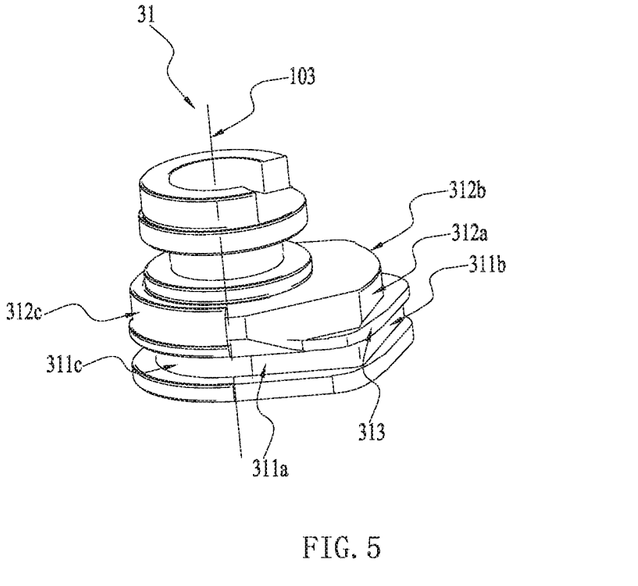
FIG. 5 is a schematic view of a rotating element in FIG. 4.

Referring to FIGS. 4-5, in a direction of the first axis 103, the first supporting portion 311 and the second supporting portion 312 are disposed at different axial positions of the rotating element 31. A partition portion 313 can be disposed between the first supporting portion 311 and the second supporting portion 312. The partition portion 313 can be a rib which is protruded from the first supporting portion 311 and the second supporting portion 312.

The first supporting portion 311 for contacting with the first connecting leg 321 is disposed at a first axial position. The first supporting portion 311 includes a first supporting surface 311a which is extended in a direction parallel to the first axis 103. The first supporting surface 311a partially surrounds the first axis 103. The first supporting surface 311a is formed with a first distal end contacting point 311b and a first proximal end contacting point 311c on the different circumferential positions thereof. The first distal end contacting point 311b is further from the first axis 103 relative to the first proximal end contacting point 311c. When the first connecting leg 321 contacts with the first proximal end contacting point 311c, it is closest to the first axis 103.

The second supporting portion 312 for contacting with the second connecting leg 322 is disposed at a second axial position. The second supporting portion 312 includes a second supporting surface 312a which is extended in the direction parallel to the first axis 103. The second supporting surface 312a partially surrounds the first axis 103. The second supporting surface 312a is formed with a second distal end contacting point 312b and a second proximal end contacting point 312c on the different circumferential positions thereof. The second distal end contacting point 312b is further from the first axis 103 relative to the second proximal end contacting point 312c. When the second connecting leg 322 contacts with the second distal end contacting point 312b, it is furthest from the first axis 103. When the second connecting leg 322 contacts with the second proximal end contacting point 312c, it is closest to the first axis 103.

The first connecting leg 321 and the second connecting leg 322 are respectively disposed on the two sides of the rotating element 31. In the direction of the first axis 103, the first connecting leg 321 and the second connecting leg 322 respectively correspond with the first supporting surface 311a and the second supporting surface 312a.

The first supporting surface 311a includes a first revolved surface which is approximately a cylindrical surface. The cylindrical surface can be a part of the surface of a cylinder which centers on the first axis 103. The second supporting surface 312a includes a second revolved surface which is approximately a cylindrical surface. The cylindrical surface can be a part of the surface of a cylinder which centers on the first axis 103. The first proximal end contacting point 311c is disposed on the first revolved surface, and the second proximal end contacting point 312c is disposed on the second revolved surface. Thus, when the rotating element 31 is rotated, if the first connecting leg 321 contacts with the first revolved surface, a distance between the first connecting leg 321 and the first axis 103 remains unchanged; and if the second connecting leg 322 contacts with the second revolved surface, a distance between the second connecting leg 322 and the first axis 103 remains unchanged. It is contemplated that, the first proximal end contacting point 311c is disposed on the first revolved surface, so any point on the first revolved surface can be considered as the first proximal end contacting point 311c. Likewise, any point on the second revolved surface can be considered as the second proximal end contacting point 312c. In the same way, the first distal end contacting point 311b and the second distal end contacting point 312b can be respectively disposed on a revolved surface.

A first connecting line connecting one first proximal end contacting point 311c and one first distal end contacting point 311b is intersected with a second connecting line connecting one second proximal end contacting point 312c and one second distal end contacting point 312b. Thus, as the rotating element 31 is rotated, while the first connecting leg 321 is driven to be closest to the first axis 103, the second connecting leg 322 is driven to be furthest from the first axis 103, or the second connecting leg 322 is driven to be closest to the first axis 103 or at a position between the furthest position and the closest position relative to the first axis 103, so that the function is switched.

Figure 6:
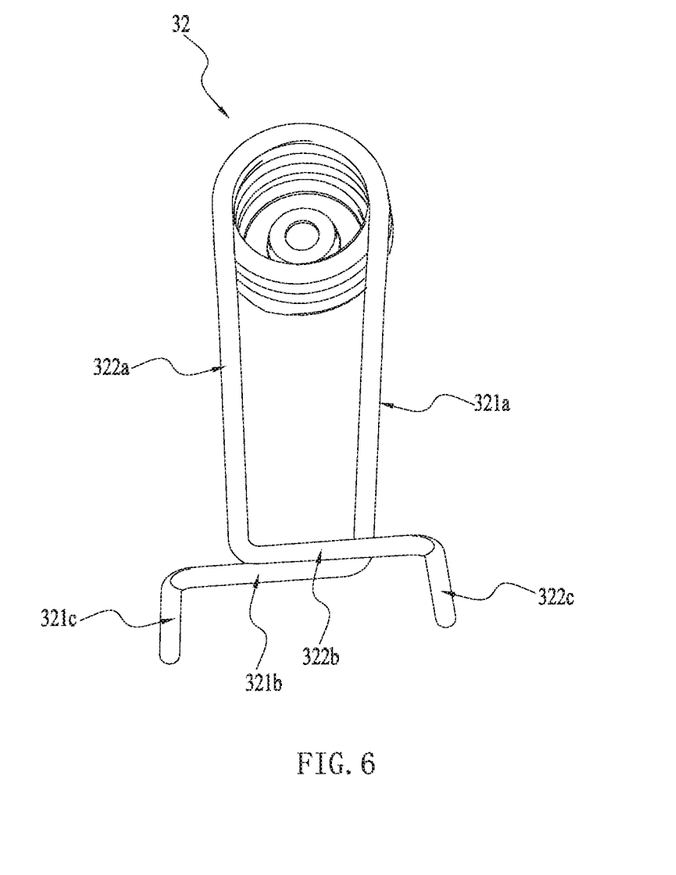
FIG. 6 is a schematic view of an elastic element in FIG. 4.

Referring to FIGS. 4-6, the elastic element 32 may be a torsional spring. The first connecting leg 321 and the second connecting leg 322 are respectively formed on the two ends of the torsional spring.

The first connecting leg 321 includes a first supporting segment 321a, a first connecting segment 321b and a first driving segment 321c. The second connecting leg 322 includes a second supporting segment 322a, a second connecting segment 322b and a second driving segment 322c.

The first supporting segment 321a extending in a linear direction is connected with the elastic connecting portion 323 on its one end and connected with the first connecting segment 321b on its other end. The first connecting segment 321b is extended in a direction approximately perpendicular to the first supporting segment 321a and bent from the first supporting segment 321a towards the second connecting leg 322. The first connecting segment 321b is connected with the first supporting segment 321a on its one end and connected with the first driving segment 321c on its other end. The first driving segment 321c is extended in a direction which is perpendicular to a plane formed by the first supporting segment 321a and the first connecting segment 321b. The first driving segment 321c is connected with the first connecting segment 321b on its one end and connected with the first clutch element 28. The plane formed by the first supporting segment 321a and the first connecting segment 321b is perpendicular to the first axis 103.

The second supporting segment 322a extending in a linear direction is connected with the elastic connecting portion 323 on its one end and connected with the second connecting segment 322b on its other end. The second connecting segment 322b is extended in a direction approximately perpendicular to the second supporting segment 322a and bent from the second supporting segment 322a toward the first connecting leg 321. The second connecting segment 322b is connected with the second supporting segment 322a on its one end and connected with the second driving segment 322c on its other end. The second driving segment 322c is extended in a direction which is perpendicular to a plane formed by the second supporting segment 322a and the second connecting segment 322b. The second driving segment 322c is connected with the second connecting segment 322b on its one end and connected with the second clutch element 29. The plane formed by the second supporting segment 322a and the second connecting segment 322b is perpendicular to the first axis 103.

Referring to FIGS. 2-4 and 7, the first clutch element 28 is formed with a first sliding portion 281 and a first driving portion 282. The first sliding portion 281 is formed with a first through hole 281a and a second through hole 281b. The second clutch element 29 is formed with a second sliding portion 291 and a second driving portion 292. The second sliding portion 291 is formed with a third through hole 291a and a fourth through hole 291b. The guiding rod passes through the first through hole 281a of the first clutch element 28 and the third through hole 291a of the second clutch element 29 so as to guide the first and second clutch elements 28, 29 to move in a direction parallel to the guiding rod. The first driving segment 321c of the first connecting leg 321 is extended into the second through hole 281b of the first clutch element 28, and the second driving segment 322c of the second connecting leg 322 is extended into the fourth through hole 291b of the second clutch element 29. Thus, the first connecting leg 321 and the second connecting leg 322 are capable of driving the first clutch element 28 and the second clutch element 29 to move. The first driving portion 282 is configured to engage with the first driving element 23, and the second driving portion 292 is configured to engage with the second driving element 24.

Figure 7:
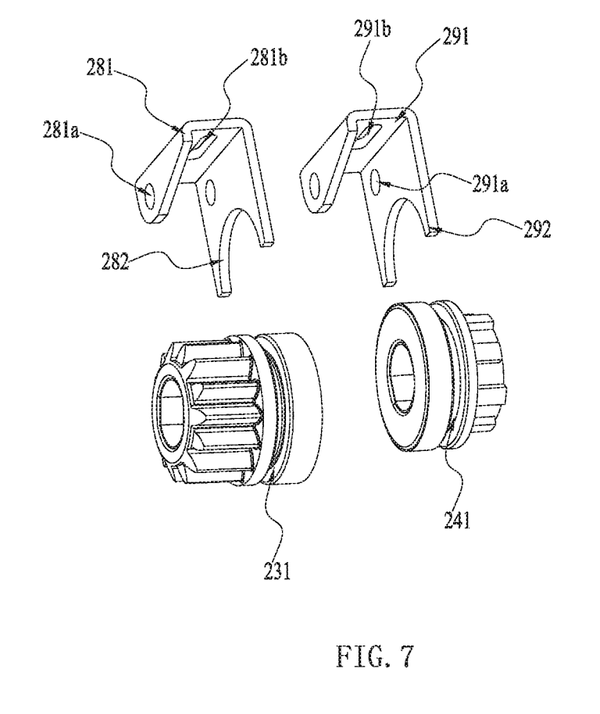
FIG. 7 is a schematic view of a first clutch element, a second clutch element, a first driving element and a second driving element in FIG. 2.

The first driving element 23 and the second driving element 24 are respectively formed with an engaging portion for engaging with the clutch device 18. Specifically, the engaging portion of the first driving element 23 is a first annular groove 231 formed thereon, and the engaging portion of the second driving element 24 is a second annular groove 241 formed thereon. The first driving portion 282 is embedded in the first annular groove 231, and the second driving portion 292 is embedded in the second annular groove 241. Thus, the first driving portion 282 is capable of driving the first driving element 23 to move in the direction of the central axis 102, and the second driving portion 292 is capable of driving the second driving element 24 to move in the direction of the central axis 102.

The rotating element 31 is disposed between the first and second connecting legs 321, 322 and capable of rotating about the first axis 103. When the rotating element 31 is rotated, the first supporting portion drives the first connecting leg 321 so as to make the first clutch element 28 slide, and the second supporting portion 312 drives the second connecting leg 322 so as to make the second clutch element 29 slide. So the first driving element 23 is driven to contact or disengage with the transmission element 22, and the second driving element 24 is driven to contact or disengage with the pendulum bearing 21. Thus, different functions are capable of being realized.

Figure 8:
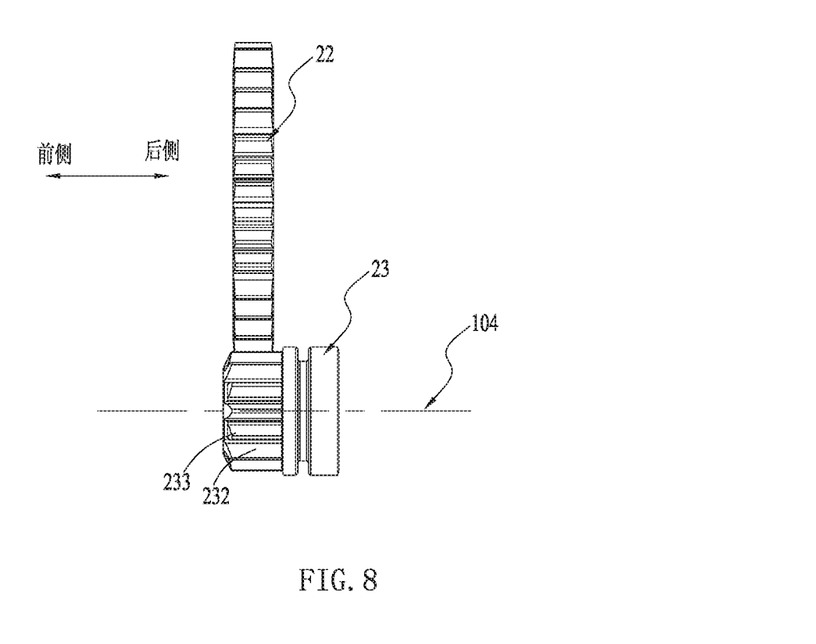
FIG. 8 is a schematic view of the first driving element and a transmission element in FIG. 2, wherein they are contacted with each other.
Figure 9:
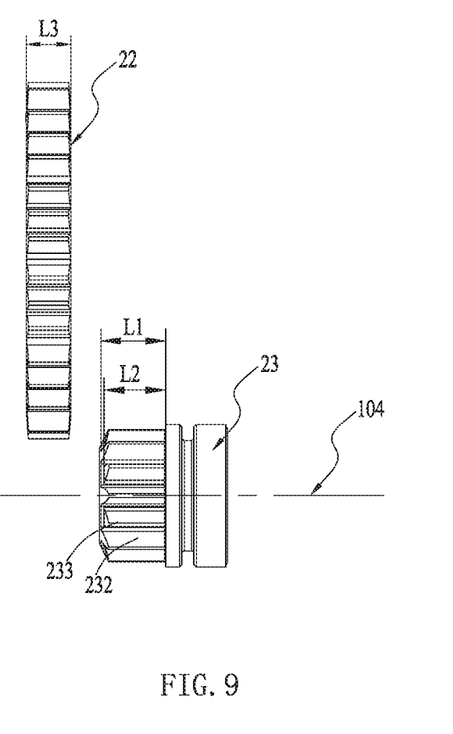
FIG. 9 is a schematic view of the first driving element and the transmission element in FIG. 2, wherein they are disengaged with each other.

Referring to FIGS. 2 and 8-9, the clutch device 18 is capable of driving the first driving element 23 to move forward in a direction of a rotating axis 104 to contact with the transmission element 22 so as to drive the transmission element 22 to rotate. The clutch device 18 is also capable of driving the first driving element 23 to move backward in the direction of a rotating axis 104 so as to disengage with the transmission element 22. The rotating axis 104 of the first driving element 23 can be the same axis as the central axis 102 of the central shaft 19. For illustrating conveniently, referring to FIGS. 8-9, a forward direction and a backward direction of the electric hammer 100 are shown.

Referring to FIGS. 8-11, the first driving element 23 is formed with first external teeth 232 and second external teeth 233. The transmission element 22 can be a transmission gear with transmission teeth.

The first external teeth 232 and second external teeth 233 are extended in the direction of the rotating axis 104 of the first driving element 23.

In a direction parallel to the rotating axis 104 of the first driving element 23, the first external teeth 232 includes a first front end 232a and a first rear end 232b, and the second external teeth 233 includes a second front end 233a and a second rear end 233b. In the direction parallel to the rotating axis 104 of the first driving element 23, the first front end 232a of the first external teeth 232 is protruded relative to the second front end 233a of the second external teeth 233, and the first rear end 232b of the first external teeth 232 is aligned with the second rear end 233b of the second external teeth 233. Here, the first front end 232a of the first external teeth 232 means one of the two ends of the first external teeth 232 which is closest to the front in the direction of the rotating axis 104, that is the end firstly contacting with the transmission element 22 when the first driving element 23 is moved forward in the direction of the rotating axis 104. The second front end 233a of the second external teeth 233 means one of the two ends of the second external teeth 233 which is closest to the front in the direction of the rotating axis 104.

Figure 10:
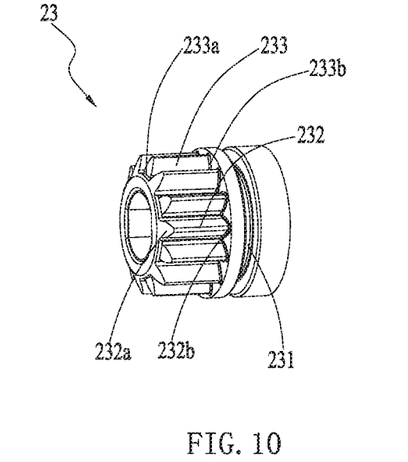
FIG. 10 is a schematic view of the first driving element in FIG. 8.

As shown in FIG. 10, the first and second external teeth 232, 233 are distributed uniformly on the circumference of the first driving element 23 and disposed at the same axial position approximately. The first and second external teeth 232, 233 and the first annular groove 231 are disposed at different axial positions.

Figure 11:
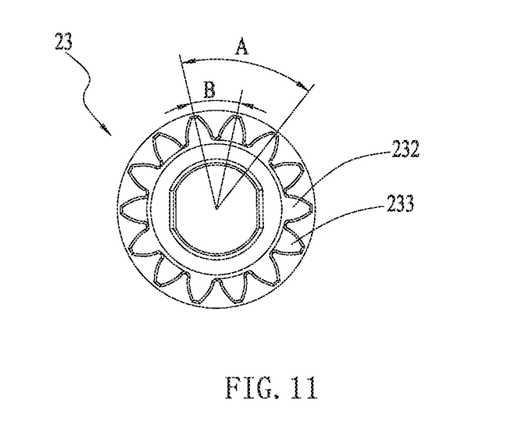
FIG. 11 is a front view of the first driving element in FIG. 8.

Between two adjacent first external teeth 232, there is one second external tooth 233. The first external teeth 232 have a first axial length L1 in its extending direction, and the second external teeth 233 have a second axial length L2 in its extending direction. The first axial length L1 is greater than the second axial length L2. The transmission element 22 has a third axial length L3 which is less than the first axial length L1 of the first external teeth 232, so it facilitates the engagement between the transmission element 22 and the first driving element 23.

Because the retracted second external tooth 233 is disposed between two adjacent first external teeth 232, when the first driving element 23 is moved forward in the direction of the rotating axis 104, the transmission teeth of the transmission element 22 is capable of snapping in a space between the first external teeth 232 and the second external teeth 233 at any position of an angle A formed between two adjacent second external teeth 233 in a circumferential direction surrounding the rotating axis 104. The angle A facilitating the transmission element 22 to snap in the space the first driving element 23 between two adjacent first external teeth 232 in the invention hereinafter claimed is much greater than an angle B in the prior art wherein the first front end of the first external teeth is aligned with the second front end of the second external teeth.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. An electric hammer, comprising:
    a rotating assembly for outputting rotating force;
    a motor having a motor shaft; and
    a transmission assembly for transferring power output by the motor to the rotating assembly, the transmission assembly comprising:
        a transmission element rotating synchronously with the rotating assembly;
        a first driving element being capable of rotating when driven by the motor; and
        a clutch device being capable of driving the first driving element to move forward in a direction of a rotating axis of the first driving element to contact with the transmission element so as to drive the transmission element to rotate or move backward to disengage with the transmission element,
    wherein the first driving element is formed with first external teeth extending in a direction substantially parallel to the rotating axis of the first driving element, second external teeth extending in the direction substantially parallel to the rotating axis of the first driving element and, in a direction substantially parallel to the rotating axis of the first driving element, the first external teeth have a first front end, the second external teeth have a second front end, and the first front end is protruded relative to the second front end,
    and the first external teeth and the second external teeth are spaced apart from each other in a circumferential direction around the rotating axis;
    wherein the clutch device comprises:
        a guiding element;
        a first clutch element being capable of sliding relative to the guiding element;
        a second clutch element being capable of sliding relative to the guiding element;
        an elastic element comprising a first connecting leg and a second connecting leg which are respectively connected with the first clutch element and the second clutch element; and
        a rotating element being capable of rotating about a first axis relative to the guiding element, the rotating element is formed with:
            a first supporting portion for contacting with the first connecting leg, which is disposed at a first axial position of the first axis,
            a second supporting portion for contacting with the second connecting leg, which is disposed at a second axial position of the first axis,
            a partition portion disposed between the first supporting portion and the second supporting portion separating the first supporting portion and the second supporting portion on the first axis,
            wherein the partition portion protrudes from the first supporting portion and the second supporting portion in a radial direction perpendicular to the first axis, and the first connecting leg and the second connecting leg intersect each other; and
        wherein when the rotating element is rotated about the first axis, the first connecting leg is driven by the first supporting portion so that the first clutch element slides relative to the guiding element, and the second connecting leg is driven by the second supporting portion so that the second clutch element slides relative to the guiding element.

2. The electric hammer of claim 1, wherein the first external teeth have a first axial length in their extending direction, the second external teeth have a second axial length in their extending direction, and the first axial length is greater than the second axial length.

3. The electric hammer of claim 2, wherein, between two adjacent first external teeth, there is one second external tooth.

4. The electric hammer of claim 3, wherein in the direction substantially parallel to the rotating axis of the first driving element, the first external teeth have a first rear end, the second external teeth have a second rear end, and the first rear end is aligned with the second rear end.

5. The electric hammer of claim 1, wherein the first driving element comprises an engaging portion which is capable of making the first driving element move forward and backward when the engaging portion is engaged with the clutch device, and the engaging portion and the first external teeth are disposed at different axial positions of the first driving element.

6. The electric hammer of claim 1, further comprises an impact assembly for outputting an impact force, a central shaft being capable of rotating when driven by the motor, a pendulum bearing comprising a plate mounted on the central shaft and an oscillating rod connected with the impact assembly, and a second driving element being capable of driving the plate to rotate when contacting with the pendulum bearing, wherein the first and second driving elements are rotated synchronously with the central shaft.

7. A power tool, comprising:
    a housing;
    an output element for outputting power;
    a prime mover contained within the housing; and
    a transmission assembly for transferring the power output by the prime mover to the output element, the transmission assembly comprising:
        a transmission element being capable of driving the output element to rotate;
        a first driving element being capable of rotating when driven by the prime mover; and
        a clutch device being capable of driving the first driving element to move forward in a direction of a rotating axis of the first driving element to contact with the transmission element so as to drive the transmission element to rotate or move backward to disengage with the transmission element, wherein the first driving element is formed with a first external teeth extending in a direction substantially parallel to the rotating axis of the first driving element and a second external teeth extending in the direction substantially parallel to the rotating axis of the first driving element, and, in a direction substantially parallel to the rotating axis of the first driving element, the first external teeth have a first front end, the second external teeth have a second front end, and the first front end is protruded relative to the second front end, and the first external teeth and second external teeth are spaced apart from each other in a circumferential direction around the rotating axis;

wherein the clutch device comprises:

a guiding element;

a first clutch element being capable of sliding relative to the guiding element;

a second clutch element being capable of sliding relative to the guiding element;

an elastic element comprising a first connecting leg and a second connecting leg which are respectively connected with the first clutch element and the second clutch element; and a rotating element being capable of rotating about a first axis relative to the guiding element, the rotating element is formed with:

a first supporting portion for contacting with the first connecting leg, which is disposed at a first axial position of the first axis, a second supporting portion for contacting with the second connecting leg, which is disposed at a second axial position of the first axis, a partition portion disposed between the first supporting portion and the second supporting portion and separating the first supporting portion and the second supporting portion on the first axis, wherein the partition portion protrudes from the first supporting portion and the second supporting portion in a radial direction perpendicular to the first axis, and the first connecting leg and the second connecting leg intersect each other; and wherein when the rotating element is rotated about the first axis, the first connecting leg is driven by the first supporting portion so that the first clutch element slides relative to the guiding element, and the second connecting leg is driven by the second supporting portion so that the second clutch element slides relative to the guiding element.

8. The power tool of claim 7, wherein the first external teeth have a first axial length in their extending direction, the second external teeth have a second axial length in their extending direction, and the first axial length is greater than the second axial length.

9. The power tool of claim 8, wherein, between two adjacent first external teeth, there is one second external tooth.

10. The power tool of claim 7, wherein the first transmission element is a transmission gear with transmission teeth formed on its circumference, the first external teeth have a first axial length in their extending direction, and the transmission gear has a third axial length which is less than the first axial length.

* * * * *